United States Patent Office 3,271,557
Patented Sept. 6, 1966

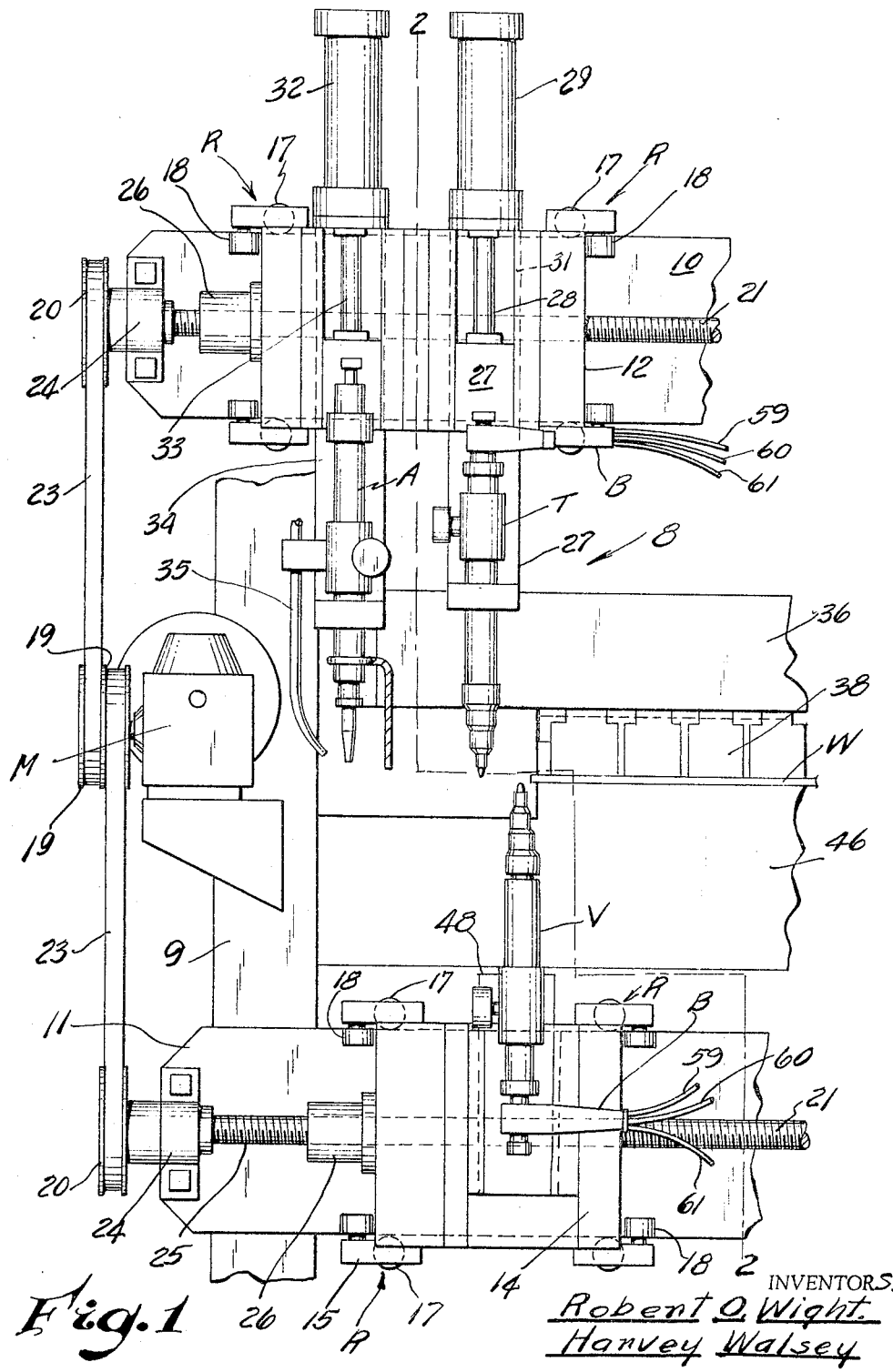

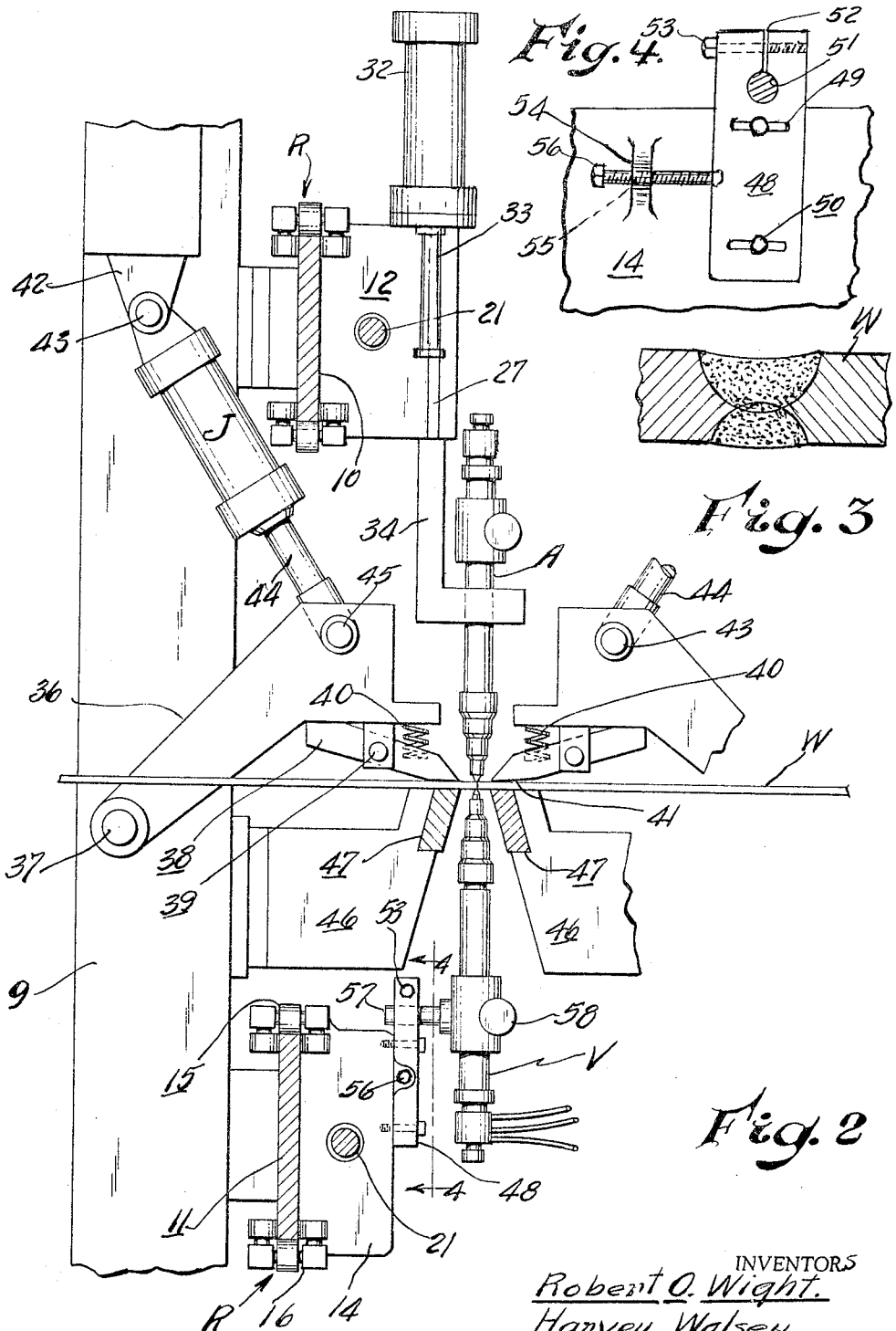

3,271,557
OVER AND UNDER TIG ARC WELDING MACHINES
Robert O. Wight, Bay City, Mich., and Harvey Walsey, Poland, Ohio, assignors to Resistance Welder Corporation, Bay City, Mich., a corporation of Michigan
Filed Jan. 6, 1965, Ser. No. 423,757
1 Claim. (Cl. 219—125)

This invention relates to the art of arc welding, and more particularly to over and under tig arc butt welding machines.

One of the prime objects of the invention is to fuse the joint crack on the lower face of the joint to close said crack and preheat the area of the work where the weld is being made.

Another object of the invention is to provide a machine having a pair of individual carriage mounted tig arc welding torches, each carriage being provided with an individual control and power source arranged with one torch under the butted sheet joint, and the other torch above the butted sheet joint.

Another object of the invention is to provide individual horizontal track mounted carriages including upper and lower torches, the lower torch being provided with a micrometer screw adjustment, in a horizontal plane, to permit advance or retardation of said lower torch with relation to the upper torch.

Still a further object is to provide an air actuated vertical slide ram, permitting torch back-off for normal sheet pass-through, and with the work in position to be welded, the ram lowers the torch into weld position.

Still another object is to provide either manual adjustment of the tungsten to compensate for burn-off and erosion, or use of an automatic arc voltage control unit which automatically adjusts the tungsten electrode to maintain a constant arc length.

With the above and other objects in view, the present invention consists in the combination and arrangement of parts, hereinafter more fully described, illustrated in the accompanying drawings, and more particularly pointed out in the appended claim; it being understood that changes may be made in the form, size, proportion and minor details of construction, without departing from the spirit, or sacrificing any of the advantages of the invention.

In the drawings:

FIG. 1 is a fragmentary, schematic, side elevational view of our new over and under arc welding machine.

FIG. 2 is a fragmentary, schematic, front elevational view thereof.

FIG. 3 is an enlarged, transverse sectional view of the work showing weld penetration.

FIG. 4 is a fragmentary, side elevational view of lower carriage showing the lower torch mounting thereon.

Referring now more particularly to the drawings in which we have shown the preferred embodiment of our invention.

The numeral 8 indicates a schematic view of the welding machine which comprises a main frame 9 of any desired design, said machine having horizontally disposed upper and lower track members 10 and 11, respectively, mounted on the frame 9, and carriages 12 and 14 are mounted for travel on said tracks.

A roller unit R is mounted on each corner of each carriage, each unit comprising a bracket 15 bifurcated as at 16 to accommodate a roller 17 which bears on the upper edge of the track, and transversely spaced depending rollers 18 are mounted on the bifurcated end of the bracket 15 for rolling engagement with the side walls of said track.

A reversible motor M is mounted on the main frame 9 in any approved manner, and has a pair of drive pulleys 19—19 drivingly connected to pulleys 20—20 which are mounted on horizontally disposed shafts 21—21 by means of belts 23 or the like, these shafts 21—21 being journaled in bearings 24—24 provided on the main frame 9, and are threaded as at 25 for threaded engagement with a ball nut 26 provided on each carriage.

An upper tig torch T is mounted on the upper carriage 10 and is connected to a vertical slide ram 27 which is connected to a piston 28 of an air cylinder 29, the side edge 30 of said slide being slidably mounted in track 31 on the carriage, said slide ram permitting torch back-off adjustment for normal sheet pass-through, and with the "work" W in position to be welded, the ram 27 lowers the torch into the proper weld position.

An annealing gas torch "A" is also mounted on the upper carriage 12 for stress relieving purposes, and is connected to an air cylinder 32 by means of piston 33, and this actuates a vertical slide ram 34 connected to said torch and piston, and an automatic torch igniter means 35 is provided on the annealing torch "A" in any desired manner.

A bracket 36 is pivotally connected to the main frame 9 by means of a pin 37, and clamping pads 38 are pivotally mounted on the lower face of the bracket by means of pins 39, and springs 40 are interposed between the bracket and the upper face of the pads 38 to provide yielding pressure on the work, the contact face 41 of the pad being smooth and flat for intimate contact with the work W. Each bracket 36 is provided with a plurality of pads 38 which provides segmental clamping of the work on both sides of the weld.

The clamping means is hydraulically actuated and comprises a hydraulic cylinder J hingedly connected to the bracket 42 by means of pin 43, the piston 44 being pivotally connected to the bracket 36 by means of pin 45, and a hydraulic line (not shown), is connected to cylinder J to provide the necessary clamping pressure on the face of the "work" to be welded. Lower clamping brackets 46 are anchored to the main frame 9 as shown, and the opposed free edges of said brackets are angularly disposed, each edge being provided with a longitudinally disposed bar 47 for reinforcing purposes, and this arrangement provides sufficient space for torch clearance and adjustments, etc.

The lower electrode torch V is mounted on a vertical support 48 provided on the carriage 14, said support being provided with vertically spaced, horizontal, slotted openings 49 therein (see FIG. 4 of the drawings), which accommodate bolts 50 adjustably mounted on the carriage 14. An opening 51 is provided at the upper end section of the support 48, and a slit 52 extends from the upper edge to said opening, a bolt 53 being disposed transversely of the support for clamping purposes, and a lug 54 is provided on the carriage as shown, said lug being provided with a threaded opening 55 which accommodates a threaded adjusting bolt 56 which is pivotally connected to the torch support 48 in any desired manner.

The torch V is provided with a laterally projecting pin 57 which is mounted in the opening 51 and held in position by tightening the bolt 53, and it will be obvious that this mounting permits pivotal movement of the torch, when necessary, while the bolt 56 permits longitudinal shifting of the torch with relation to the carriage when necessary.

The tig torch "V" is normally in advanced relation to the upper torch "T" by approximately one-quarter to three-fourths inches, and this makes the weld pass equal to the length of the space differential before initiation of the upper torch, said lower torch being provided with a micrometer screw adjustment 58, in a horizontal plane, to permit advance or retardation of the lower torch with respect to the work. Laterally projecting hollow members "B—B" are provided on each of the torches T and V and accommodate wiring, water and gas tubes 59–60 and 61, respectively.

One of the primary advantages of this over and under arrangement is that the lower torch V first fuses the joint crack in the lower side of the joint, closing the crack and preheating the area being welded as the carriages travel. With the lower side of the butt joint fused, and the joint preheated, the upper weld unit completes the fusion of the joint on the upper face of the "work" to accomplish full penetration as clearly shown in FIGURE 3 of the drawings. To prevent air turbulence created by the annealing torch "A" affecting torch "T," we provide a shield 62 which is mounted on the torch "A" in any satisfactory manner, the shield 62 being interposed between the torches "A" and "T" to eliminate strong air currents created by the annealing torch.

This over and under welding technique is used most advantageously when both the leading and trailing sheets are sheared during a common set-up, wherein the shear (not shown) trims both leading and trailing edges without resetting the shear point, then with both sheared edges contained in sheared position, the shear is shifted over and the torch units are moved into position directly over and under the weld joint, thus insuring a tight gap-free joint the full width of the strip as clearly shown in FIG. 3 of the drawings.

Another important advantage in this over and under machine is the provision of the annealing torch "A" which accomplishes a combination annealing stress relieving function to minimize stresses within the welded area, thus minimizing tendency of certain material to crack, and also minimizing tendency of certain materials to crack adjacent to or in the weld zone. Clamping of both sheet edges E—E adjacent to the weld butt line is accomplished by means of the segmental spring-pressed pads 38 which are in turn mounted or connected to the clamp arms 36 which are hydraulically actuated to apply heavy clamping forces to the butted ends of the strips.

From the foregoing description, it will be obvious that we have perfected a very simple, practical and economical over and under tig arc butt welding machine which has greater weld speeds than any machines presently on the market, which provides uniform penetration from both sides of the strips with uniform stresses producing greater weld strength than is possible where the weld joint is produced by a single torch from one side.

We claim:

An over and under butt welding machine comprising: a main frame; a work table; vertically spaced top and bottom tracks mounted on said frame; an individual carriage slidably mounted on each track; roller units mounted on each corner of each carriage and having rolling engagement with the side wall and upper edge of the track; an electrode torch mounted on the upper carriage; brackets mounted on the main frame and spring pressure pads pivotally mounted on said brackets for yielding engagement with the "work"; a torch support on the lower carriage; a lower torch adjustably mounted on said support, in advance of the electrode torch, and means for traveling said carriages on said tracks.

References Cited by the Examiner

UNITED STATES PATENTS

| | | | |
|---|---|---|---|
| 2,716,691 | 8/1955 | Bowman | 219—61 |
| 2,743,692 | 5/1956 | Wietzel et al. | 113—134 |
| 2,756,311 | 7/1956 | Persson et al. | 219—130 |

FOREIGN PATENTS

| | | |
|---|---|---|
| 154,929 | 1/1954 | Australia. |

RICHARD M. WOOD, *Primary Examiner.*